2,515,510

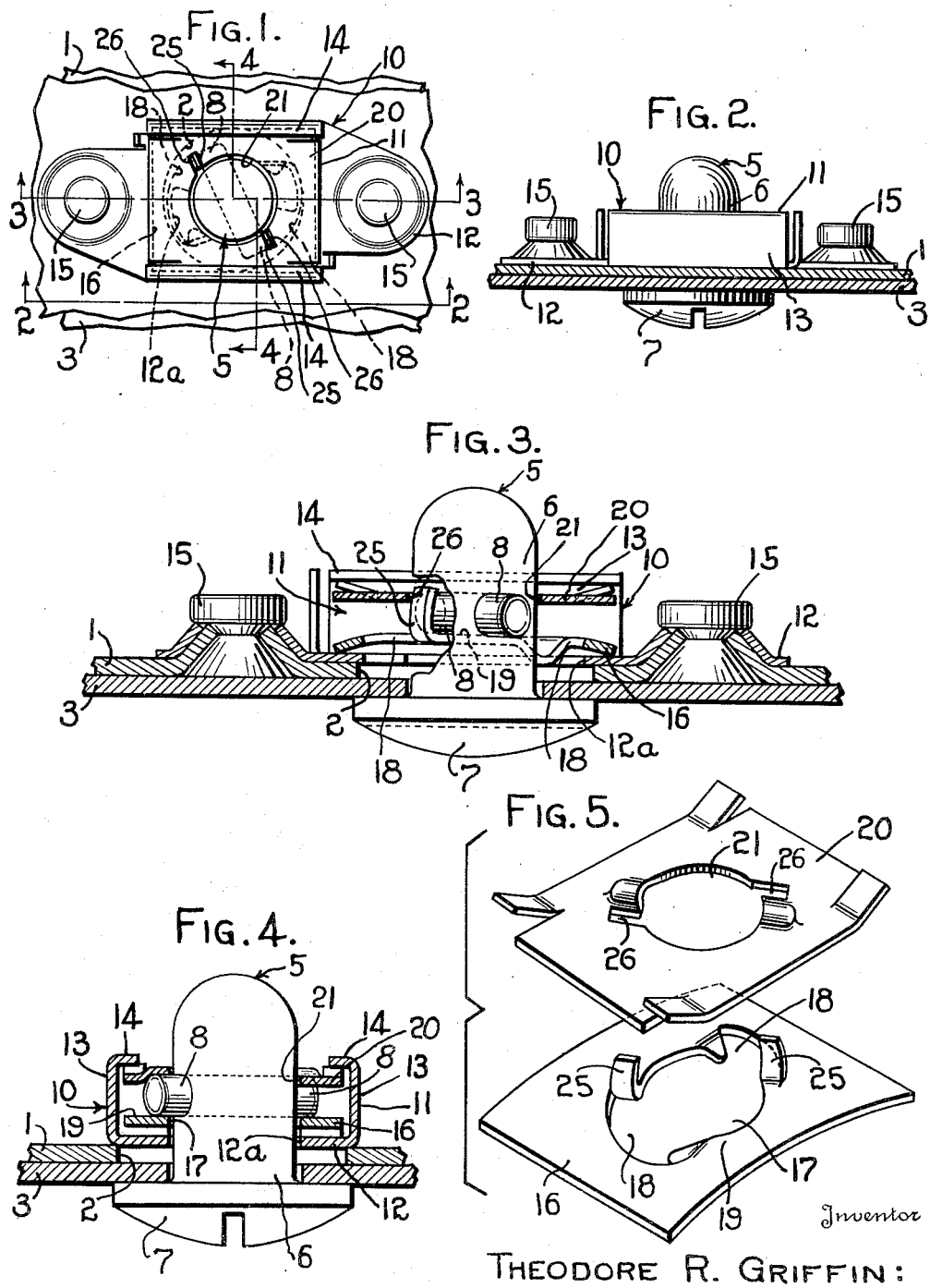
July 18, 1950 — T. R. GRIFFIN — 2,515,510
COWL FASTENER
Filed Aug. 8, 1947
Inventor
THEODORE R. GRIFFIN
By John Todd
Attorney Patented July 18, 1950

UNITED STATES PATENT OFFICE 2,515,510

COWL FASTENER

Theodore R. Griffin, Lexington, Mass., assignor to United-Carr Fastener Corporation, Cambridge, Mass., a corporation of Massachusetts Application August 8, 1947, Serial No. 767,513

1 Claim. (Cl. 24—221)

The present invention relates to fasteners and particularly to fasteners of the so-called cowl-fastener type and aims generally to improve and simplify fasteners of that kind.

One of the objects of the invention is the provision of an improved and simplified fastener element designed for engagement with a cooperating rotary stud fastener element and constructed of separable elements capable of being selectively heat-treated and annealed and readily assembled with a minimum of labor.

A further object of the invention is the provision of a cowl fastener element in which the stud-engaging part is shiftable to a substantial degree.

A still further object of the invention is the provision of a cowl fastener element adaptable for general application and which is of extremely simple construction, economical of manufacture and light in weight.

Other aims and objects of the invention will be apparent to persons skilled in the art to which the invention relates from a consideration of the accompanying drawings and annexed specification illustrating and describing one preferred form of the invention.

In the drawings:

Fig. 1 is a top plan view of a fastener secured installation illustrating one preferred embodiment of stud-engaging fastener member according to the invention;

Fig. 2 is a side elevation of the installation shown in Fig. 1, the support and part to be attached thereto being shown in section as if the view were taken on the line 2—2 of Fig. 1;

Fig. 3 is an enlarged longitudinal sectional view as taken on the line 3—3 of Fig. 1;

Fig. 4 is an enlarged transverse sectional view of the installation as taken on the line 4—4 of Fig. 1; and Fig. 5 is a detail perspective view of the stud-engaging fastener parts.

Fasteners of the so-called cowl fastener type, to which the invention particularly relates, generally comprise a stud-engaging fastener part 10, mounted on a support 1 which is apertured at 2 for the passage of a stud 5 rotatably mounted in a part 3 which is adapted to be replaceably attached to the support 1. The stud may be of any of the well known accepted designs but preferably includes a shank 6 having an enlarged head 7 at one end and a cross pin adjacent the other end, said pin presenting radially extending arms 8 adapted for cooperative locking engagement with the fastener part 10 as is well understood in the art. The stud 5 is rotatably retained in the part 3 by reason of the enlarged head 7 and the radial arms 8 disposed on opposite sides of the part 3.

The stud-engaging fastener part 10 preferably comprises a retainer member 11 herein illustrated as comprising a base plate 12 and outwardly extending retainer guides 13 having inwardly extending flanges 14 along their outer edges and forming therebetween an elongated guide or cage for the stud-engaging fastener part or parts 10. The base plate 12 of the retainer 11 is apertured as at 12a to be aligned with the aperture 2 of the support 1, both of which preferably are substantially larger than the diameter of the stud shank 6. The retainer member 11 is provided with suitable attaching means, as for example apertures adapted to receive rivets 15 for securing the retainer to the support 1.

The stud-engaging fastener member comprises a load-carrying member which preferably is separate from the base plate 12 and is shiftably mounted within the guide portion of the retainer. The load-carrying member may be in the form of a separate arched plate 16 advantageously of elongated rectangular construction and having a central aperture 17 and radial elongations 18 for the passage of the stud shank 6 and arms 8 therethrough. The radial elongations 18 extend from the aperture toward the ends of the plates 16 so that the arms 8 of the stud 5 may be passed therethrough and moved over the marginal surface of the plate before the support 1 and part 3 are drawn together in final clamped relation. The arched shape of the plate 16 provides upwardly inclined or cam surfaces 19 along which the pin arms 8 may ride upon partial rotation of the stud and thus effectively draw the support 1 and part 3 together in final clamped fastened relation.

The plate 16, being separate from the base plate 12 and being longitudinally arched as shown in Figs. 4 and 5, has sliding bearing engagement at its ends with the base plate 12 and thus may shift readily in a direction longitudinally of the base plate to receive the stud without necessarily being coaxial with the opening 12a. Preferably the spacing between the retainer sides 13 is slightly greater than the width of the plate 16, so that the plate may be shiftable in the retainer in all directions.

So-called cowl fasteners are of two types, one the flexible type in which the load-carrying surface is resilient and (2) the rigid type in which the load-carrying surface is a rigid and unyielding part of the base plate. The present invention is adaptable to either of the above referred to types and either a rigid or resilient fastener may be provided by using the proper type plate 16. For example, a spring load plate 16 would be used in the resilient type, the central portion of which would yield toward the base plate as the stud is turned to fully locked position, and a stiffer heat-treated plate 16 would be used for the rigid types where yielding is not desired.

The plate member 16 above may constitute the stud-engaging fastener members, or if automatic partial ejection is desired of the stud when in unlocked position, the plate 16 may be associated with a superposed resilient plate 20 provided with an aperture 21 to permit the passage of the nose end of the stud shank 6 as shown in Figs. 3, 4 and 5. If desired, this plate 20 may be arched longitudinally in opposed relation to the plate 16 so that the pin arms 8 will be moved between the two plates upon partial rotation of the stud. The plate 20 will be prevented from outward displacement by the internal flanges 14 of the retainer slide 13, and preferably will be under tension by the pin arms 8 as the latter are moved across the cam faces 19 of the plate 16. As the plate aperture 21 does not have radial elongations corresponding with and superimposing the elongations 18 of the plate 16, portions of the plate 20 will bear upon the stud arms 8 at all times, and will act to partially eject the stud when in unlocked position, as for example when the arms 8 are in registry with the elongations 18 in the plate 16.

Means are provided for limiting rotation of the stud member 5 in a fastener locking direction, and preferably comprises a stop member on one of the parts 16 or 20 and extending toward the other member. As herein illustrated, the stud arm stop members 25 are arms integral with and extending normal to the plate and may be disposed radially of the aperture 17 in predetermined angular relation to the radial elongation 18. Preferably the stop arms are so placed that they will be engaged by the pin arms 8 as they pass the crest or high mid-point of the arched plate 16.

In some cases it is desirable that the plates 16 and 20 be shiftable as a unit within the retainer. This may readily be accomplished by making the stop arms 25 sufficiently long so as to extend through the other plate 20. In the illustrated embodiment the stop arms 25 on the plate 16 are sufficiently long to extend through slots 26 in the plate 20, which may be, as illustrated in Fig. 5, radial elongations of the aperture 21.

From the above it will be seen that the invention provides a cowl fastener consisting essentially of two separate plate or washer members between which the stud arms 9 slide. The lower plate or washer serves as a cam for effecting a clamping together of the parts to which the fastener parts are secured, as the stud arm is rotated in a fastening direction. The upper plate bears on the stud arms at all times during its traverse across the lower plate, and serves to partially eject the stud when the arms are in registry with the elongation 18.

In assembling the fastener and attaching it to the support, the proper type plate 16 having been selected is assembled with the plate 20 as a unit and constitutes the stud-engaging fastener member. This unit is then assembled within the guide portion of the retainer 11 after which the retainer may be secured to the support 1, as by the rivets 15.

Although I have illustrated and described preferred forms of my invention, I do not wish to be limited thereby because the scope of my invention is best defined by the following claim.

I claim:

A fastener device comprising separate concave-convexed load-carrying and stud-tensioning members between which the fastener-engaging arms of a rotary stud are adapted to slide, an arm on one member extending into a slot in the other member removably connecting said members together to form a unitary stud-engaging fastener part and serving to limit the rotation of a stud fastener part therebetween, and cage-like mounting means holding said members in assembly and adapted to secure said stud-engaging fastener part to a support.

THEODORE R. GRIFFIN.

REFERENCES CITED

The following references are of record in the file of this patent:

UNITED STATES PATENTS

| Number | Name | Date |
| --- | --- | --- |
| 2,327,331 | Pender | Aug. 17, 1943 |
| 2,401,184 | Poupitch | May 28, 1946 |
| 2,414,272 | Poupitch | Jan. 14, 1947 |